J. H. BROWN.
INNER TUBE FOR PNEUMATIC TIRES.
APPLICATION FILED NOV. 24, 1909.
956,884. Patented May 3, 1910.
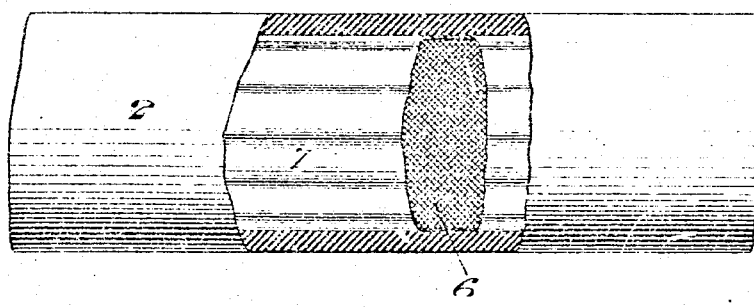
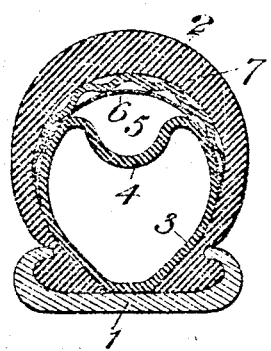 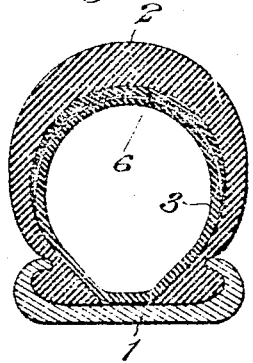
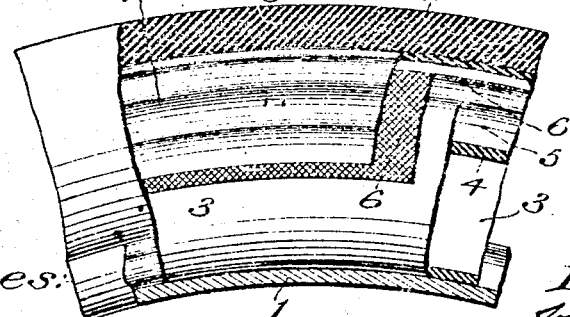

UNITED STATES PATENT OFFICE.

JOHN H. BROWN, OF WEST HOBOKEN, NEW JERSEY, ASSIGNOR TO BROWN PERFECTION TUBE COMPANY.

INNER TUBE FOR PNEUMATIC TIRES.

956,884. Specification of Letters Patent. Patented May 3, 1910.

Application filed November 24, 1909. Serial No. 529,738.

*To all whom it may concern:*

Be it known that I, JOHN H. BROWN, a citizen of the United States, and resident of West Hoboken, in the county of Hudson and State of New Jersey, have invented new and useful Improvements in Inner Tubes for Pneumatic Tires, of which the following is a specification.

This invention relates to improvements in inner tubes for pneumatic tires and has for its object to provide an inner tube which will be extremely difficult to puncture when inflated within its casing, the structure of the tube being such that one or more layers of the inner tube will be compressed when the tube is inflated rather than extended as is now common.

A practical embodiment of my invention is represented in the accompanying drawings, in which—

Figure 1 represents in top plan a portion of a pneumatic tire with parts of the same broken away to more clearly illustrate the interior construction thereof, Fig. 2 is a cross section through the same with the inner tube deflated, Fig. 3 is a similar view with the inner tube inflated, and Fig. 4 is a detail view in side elevation, partly in section, of the tire with the inner tube in its deflated condition.

The rim in connection with which the pneumatic tire is shown is denoted by 1 and may be of any well known or approved form. The casing 2 of the pneumatic tire may also be of any well known or approved construction.

The inner tube of elastic material, such as rubber compound, is denoted by 3 and it is provided with one or more layers which are so constructed that when the tube is inflated the material in the one or more layers will be compressed for resisting punctures. In the present instance I have shown the outer portion of the inner tube itself as being circumferentially depressed as shown at 4 and held in such depressed condition to form a circumferential depression 5 when the inner tube is deflated, by a circumferential binding strip 6 of substantially non-elastic flexible material, such, for instance, as a closely woven fabric, the side edges of which are permanently united to the side walls of the inner tube 3 along peripheral lines.

When the inner tube is inflated, the outer portion 4 of the inner tube will be compressed to a great degree thus making it extremely difficult to puncture and capable of immediately sealing the puncture when the foreign object producing the puncture is withdrawn. The strip 6 also serves as an additional protector for the outer portion of the inner tube. This inner tube may be still further provided with another layer 7 of elastic material interposed between the inner wall of the casing 2 and the outer portion of the inner tube 3. The side edges of this elastic protecting strip 7 are permanently united to the side walls of the inner tube 3 either directly to the inner tube or to the non-extensible strip 6. This elastic protecting strip 7 is fulled laterally when applied to the inner tube in its normal condition so as to form a series of circumferential corrugations or wrinkles.

When the inner tube is inflated, the elastic material which forms the protecting strip 7 will be laterally compressed between the binding strip 6 and the inner wall of the tire casing 2 thus making the protecting strip extremely difficult to puncture.

It will be seen that by forming an inner tube, as herein shown and described, with either one or both layers of compressed material, when the tube is inflated, the liability of puncture when in use is materially reduced thus adding to the efficiency of the tire.

What I claim is:—

1. In combination, a restraining casing, an inflatable tube within the casing and a substantially non-yielding strip of material permanently secured to the inflatable tube along peripheral lines spaced apart, the portion of the inflatable tube between said peripheral lines being normally in a non-compressed condition and having a greater normal width than the width of the non-yielding material between said lines and adapted to be forced into the circumferential plane of the tube when the tube is inflated.

2. In combination, a restraining casing, an inflatable tube within the casing, a substantially non-yielding strip of material permanently secured to the inflatable tube along peripheral lines spaced apart and a strip of yielding material secured at its edges along peripheral lines exterior to the strip of non-yielding material, the portion of inflatable tube between said peripheral lines and the portion of yielding strip between its lines of attachment both having a greater normal width than the width of the non-yielding material between said lines and adapted to be forced into circumferential planes on the outer and inner sides of the non-yielding strip when the tube is inflated.

In testimony, that I claim the foregoing as my invention, I have signed my name in presence of two witnesses, this 18th day of November 1909.

JOHN H. BROWN.

Witnesses:
F. GEORGE BARRY,
C. S. SUNDGREN.